United States Patent [19]

Perry et al.

[11] 4,142,576
[45] Mar. 6, 1979

[54] HEAT PUMP SYSTEM WITH IMPROVED HEAT TRANSFER

[75] Inventors: Elijah R. Perry, Portola Valley; Mario Rabinowitz, Menlo Park, both of Calif.

[73] Assignee: Electric Power Research Institute, Inc., Palo Alto, Calif.

[21] Appl. No.: 800,705

[22] Filed: May 26, 1977

Related U.S. Application Data

[62] Division of Ser. No. 718,348, Aug. 27, 1976, Pat. No. 4,042,012.

[51] Int. Cl.² .................. F25B 27/02; F28F 1/22
[52] U.S. Cl. .................... 165/45; 165/104 S
[58] Field of Search .......... 165/104 S, 45; 126/400

[56] References Cited

U.S. PATENT DOCUMENTS

| 2,846,421 | 8/1958 | Pollock | 165/104 S |
|---|---|---|---|
| 3,563,304 | 2/1971 | McGrath | 165/45 X |
| 4,010,731 | 3/1977 | Harrison | 165/104 S X |
| 4,011,736 | 3/1977 | Harrison | 165/45 |

FOREIGN PATENT DOCUMENTS 59350  2/1912  Switzerland ................ 65/45

Primary Examiner—William L. Freeh
Assistant Examiner—Richard E. Gluck
Attorney, Agent, or Firm—Flehr, Hohbach, Test, Albritton & Herbert

[57] ABSTRACT

A heat pump for cooling or heating a conditioned space includes an underground heat pipe laid into a hole in the ground back-filled with soil. The heat transfer of the soil is improved by dispersing highly water-absorbent hydrophilic polymeric gel particles soaked with water around the heat pipe. The water-soaked particles preferably are coated with a water-impermeable film. The water may also be entrapped in liquid form in small bags. Also, a water impermeable sheath may be formed around the back-fill soil to minimize evaporation from the particles.

6 Claims, 4 Drawing Figures

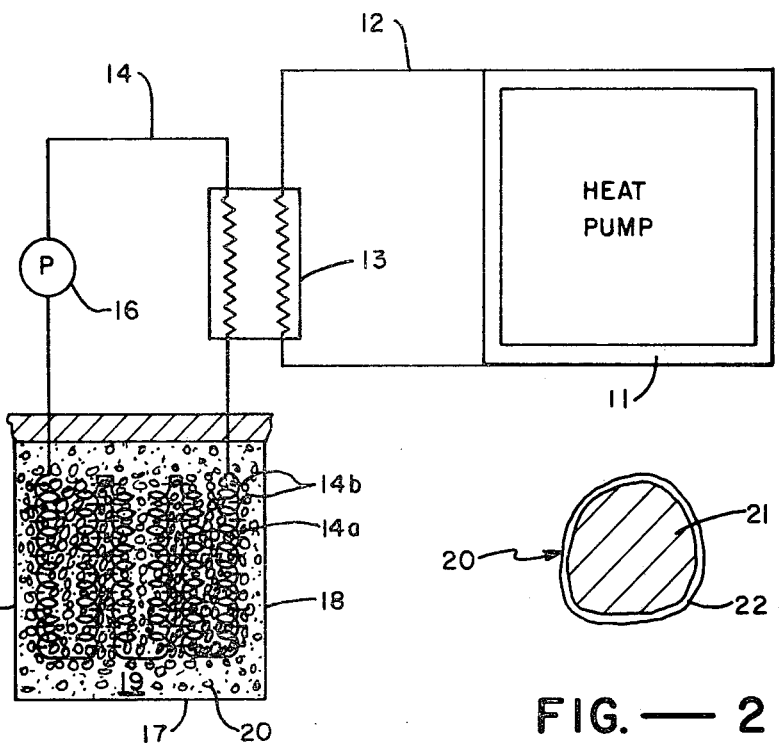
FIG.—4
FIG.—1
FIG.—2
FIG.—3

HEAT PUMP SYSTEM WITH IMPROVED HEAT TRANSFER

This is a division of application Ser. No. 718,348 filed Aug. 27, 1976, now U.S. Pat. No. 4,042,012.

CROSS-REFERENCE TO RELATED APPLICATION

Reference is made to Perry et al application, Ser. No. 718,349, filed Aug. 27, 1976, now U.S. Pat. No. 4,097,682, entitled Means for Protecting Underground Electrical Equipment from Thermal Runaway.

BACKGROUND OF THE INVENTION

A heat pump raises the temperature level of heat by means of work input. The pump cycle is identical with the vapor compression refrigeration system. It finds particular application for air-conditioning of an air space such as a home since it employs the same equipment to cool the conditioned space in the summer and to heat it in winter. This dual purpose is accomplished by valving which places the low temperature evaporator in the conditioned space during the summer and the temperature condenser in the same space during the winter. In effect, such heat pumps heat (or cool) the interior of the buildings by refrigerating (or heating) the outdoors. The principle of this operation was first described by Kelvin in 1852.

The coefficient of performance $cp_c$ for cooling a conditioned air space is given in equation (1) and the coefficient $cp_w$ for warming the space is given in equation (2), wherein T is the temperature ib absolute degrees and the subscripts c and h refer to the cold and hot temperatures, respectively.

$$, cp_c = \text{refrigeration/work} = T_c/(T_h - T_c) \quad (1)$$

$$, cp_w = \text{heat delivered/work} = T_c/(T_h - T_c) \quad (2)$$

It is apparent from the foregoing equations that maximum performance is obtained when the temperature differential between the outside temperature and that of the conditioned space is a minimum.

The most common source of exterior heating or cooling is the surrounding air because of its convenience. However, since the air heats to relatively high temperatures in the summer and cold temperatures in the winter, it is the least efficient source of cooling and heating. Furthermore, in most temperate zones, the heating load is usually greater than the cooling load. This leads to an imbalance in the sizing of equipment and necessitates a large, high horsepower compressor fitted to the heat demand, a supplementary heating system (electrical resistance or fuel), or a heat-storage system.

The use of well water as a heat source is more efficient than atmospheric air. However, the impurity, quality, quantity ad disposal of water and the corrosion problems of the pipe and the water have minimized the use of such systems.

Another heat source is the use of the earth itself by laying a heat pipe of the heat pump in an underground hole and then backfilling it with soil. The earth is potentially the most desirable heat source or sink because of its availability and seasonal uniformity of temperature. However, heat transfer between the liquid in the heat pipe and the soil depends largely upon the moisture content which is related to climate conditions and geological formation. That is, as the moisture content decreases, the thermal conductivity of the soil and thus the efficiency of heat transfer with the liquid in the heat pipe correspondingly decreases. This is a particular problem during the summer months in which the moisture content decreases to a minimum, due, in large part, to the heating of the soil by solar energy during the longer daytime periods.

Recently, various hydrophilic polymeric gel substances have been developed with extremely high water holding capacities. One such product is described in an article entitled "Super Slurper-Compound with a Super Thirst", *Agricultural Research*, June 1975 (published by Agricultural Research Service, USDA). It is a hydrolyzed starch polyacrylonitrile graft copolymer. One use disclosed for this material is to increase the water-holding capacity of sand to enhance the top growth of crops such as oats. The article states that the sand, by itself, retains only 24 grams of water compared with 317 grams of water held by the sand-gel mixture at a concentration of one part of gel to 250 parts of sand. Such gels are said to absorb as high as 1,000–2,000 times their weight of water.

Another type of hydrophilic gel is sold by Union Carbide under the trademark "Viterra" hydrogel. This synthetic material is suggested by Union Carbide to be used as an additive to the soil to assist transfer of water and nutrients to a growing plant. Product literature from Union Carbide suggests that the Viterra hydrogel can retain more than twenty times its dry weight of water. Another such product called "Imbiber Beads" is manufactured by the Dow Chemical Company with a 27:1 holding capacity.

All these polymers have the capacity to take in a large quantity of water without becoming dissolved. The water actually penetrates the polymer network causing the size of the particle to increase, but in so doing, no large pockets of water are formed which might later leak out. The water is actually entrapped by the molecular structure of the polymer. It is extremely difficult to squeeze out entrapped water from the polymer. However, water can be evaporated from the polymers, and the starch-based copolymer is biodegradable.

Summary of the Invention and Objects

In accordance with the present invention, the heat transfer of a heat pump using the ground as a heat source or sink is improved by surrounding the underground heat pipe with soil containing a plurality of water-soaked absorbent particles to provide a jacket of high thermal conductivity. A preferred form of absorbent particles is a hydrophilic polymeric gel material. To minimize loss of water from the particles, after soaking with water, they may be coated with a water-impermeable film and then mixed with the soil. In an alternative embodiment, the particles are formed of flexible balloon-like bags filled with water without an absorbent core. Other ways to prevent loss of water from the soil surrounding the heat pipes include laying a water-impermeable film above the pipes, or completely surrounding them.

It is an object of the invention to provide a method and means for improving the heat transfer to the underground heat pipe of a heat pump.

It is a particular object of the invention to accomplish the foregoing object by including highly absorbent particles soaked with water or water-filled, balloon-like bags in the soil back-fill.

It is another object of the invention to retain the water in the soaked absorbent particles in the soil back-fill by coating them with a film of water-impermeable film.

It is an additional object of the invention to provide a roof to prevent evaporation from the water absorbent particles.

It is another object of the invention to provide means for preventing water from seeping out of the soil from below and to the sides of the heat pipes.

Further objects and features of the invention will be apparent from the following description in which the preferred embodiments are set forth in conjunction with the appended drawings.

BRIEF DESCRIPTION OF THE DRAWINGS

FIG. 1 is a schematic block diagram of a heat pump with an underground heat pipe in contact with underground soil having improved heat transfer characteristics in accordance with the present invention.

FIG. 2 is an expanded cross-sectional view of coated absorbent particles for use in the back-fill soil of FIG. 1.

FIG. 3 is a cross-sectional view of another embodiment of the heat pipe and underground soil combination of the present invention.

FIG. 4 is an expanded cross-sectional view of water-filled bags for use in the back-fill soil of FIG. 1.

DETAILED DESCRIPTION OF THE PREFERRED EMBODIMENTS

Referring to FIG. 1, a block flow diagram of a heat pump 11 is illustrated in which a refrigerant fluid in line 12 is circulated through a heat exchanger 13. The heat pump may be of any conventional type employed for cooling or heating a conditioned air space such as a room in a commercial or residential building. A major advantage of such heat pumps is that they employ the same equipment for cooling in summer or heating in winter by appropriate shifting of valve settings to reverse the flow of refrigerant. A typical heat pump includes a motor operated compresser, a condenser, a liquid receiver, an expansion valve and an evaporator. Any suitable refrigerant may be employed in line 12 such as a variety of chlorofluoromethane materials sold under the trademark "Freon." A detailed construction and operation of conventional heat pumps are set forth in the following books: Sporn et al, *Heat Pumps*, (Wyley & Sons, 1947); and Kemler et al, *Heat Pump Applications*, (McGraw-Hill, 1950).

Referring again to FIG. 1, heat is supplied in underground heat pipe 14 for transfer to the refrigerant in line 12 by heat exchanger 13. The liquid in pipe 14 flows in a closed loop under pressure supplied by pump 16. In the illustrated embodiment, the underground portion of pipe 14 includes a maximum surface area for heat transfer with the soil. Thus, the underground portion of of pipe 14 includes coils 14a and fins 14b. In addition, the pipe is arranged in a serpentine path as illustrated to further maximize the heat transfer area. It is preferable to form the pipe of a material of high thermal conductivity such as copper. For economy of hole space, it may be desirable to employ a plurality of underground heat pipes connected through a manifold to the main line which passes through heat exchanger 13.

The heat exchange liquid in heat pipe 14 should have good heat transfer properties and not freeze at the coldest temperature in the climate of use. Thus, water may be employed in warmer climates while an anti-freeze additive may be added to prevent freezing, if necessary. Brine is a suitable inexpensive heat exchange fluid for line 14 in a cold climate.

Referring again to FIG. 1, a hole is dug having a bottom wall 17 and upwardly extending side walls 18. Then, pipe 14 is laid into the hole and the soil removed during digging of the hole is used to bury or back-fill the heat pipe. In accordance with one embodiment of the present invention, the back-fill soil 19 surrounding pipe 14 contains water-soaked absorbent particles 20 in random dispersion. The absorbent particles 20 may be mixed during back-filling as with a hose system.

Referring to FIG. 2, in a preferred embodiment, particles 20 include a central core 21 formed of water-impermeable material. In certain environments where water loss from the soil is not excessive, it should be understood that particles 20 may comprise core 21 only without any film coating. The last-named embodiment will be first described in detail.

The purpose of adding the water-soaked particles to the back-fill surrounding heat pipe 14 is to maintain a higher water content in the soil throughout the year, especially during the hot, dry summer months. Such water content greatly increases the thermal conductivity and also thermal capacity of dry soil. Therefore, heat is readily transferred between heat pipe 14 and the moist ground. This is accomplished not only by increasing the thermal conductivity surrounding the heat pipe, but also by increasing the effective interface between the heat pipe system and the remainder of the earth.

The timing of soaking the uncoated absorbent particles 20 with water may be varied to suit the convenience of the crew laying the heat pipe 14. Thus, the particles may be soaked prior to dispersion in the back-fill soil, or during or subsequent to back-filling as by pouring water into the trench at such times.

The absorbent material of particles 20 has a high capacity for water so that it can retain a maximum water content in hot summer months. For example, the absorbent preferably is characterized by a water capacity of at least 10–20 times its dry weight. It is preferably in the form of a hydrophilic water-swellable, insoluble, cross-linked polymeric gel material.

If the particles are not protected by coating 22 they should be sufficiently inert to the soil environment and be non-biodegradable to withstand long-term retention in the soil. Suitable inert absorbent materials of this type include cross-linked synthetic polymers. One type is manufactured by Union Carbide Corporation under the trademark "Viterra" hydrogel. This material is a non-ionic polymer which is highly stable over long periods of time, even in high temperatures, is non-biodegradable and is essentially inert to acids. It is stated to have a water capacity of about 20–25 times its dry weight. Another type is manufactured by Dow Chemical Corporation under the name "Gel-Guard" and "Aqua-Biber." These materials are stated to be quite stable, non-biodegradable, and not vulnerable to acids.

A number of other solid water-insoluble sorbents that swell in water are described in a paper by Weaver et al entitled "Highly Absorbent Starch-Based Polymer," presented at the International Nonwovens & Disposables Association, Washington, D.C. Mar. 5–6, 1974. One such product is a base-hydrolyzed starch-polyacrylonitrile graft copolymer in which the nitrile functionality has been converted to a mixture of carboxyamide and alkali metal carboxylate. The paper states that after drying to the carboxylate form, this material is capable of imbibing about 700 times its own weight of deionzed water.

A particular absorbent of the general type described in the Weaver et al paper is manufactured by General Mills Chemicals, Inc., under the designation "SGP-502S," commonly referred to as "Super Slurper." This product is stated to have a typical water-holding capacity of 800–1,000 ml. of deionized water or 350–450 ml. of Minneapolis tap water per gram of product. One problem with this material is that the application of high pressure disrupts the gel structure to release absorbed fluid. Also, water-swollen dispersions of this product are stated to be susceptible to bacterial attack and to deteriorate on prolonged storage at room temperature.

Because of their stability and non-biodegradability, the Gel-Guard and Viterra hydrogel products are particularly suited for use with a protective coating 12. However, they have a far lower water capacity than the less stable, starch-based products described in the Weaver et al paper. The high capacity starch-based products may be employed by coating with a protective film of water-impermeable, non-biodegradable material as set forth hereinafter.

It should be understood that other absorbent material capable of high water retention also may be used in accordance with the present invention. For example, although not as absorbent as polymeric gel materials, certain molecular seive materials as of the inorganic zeolite type may be employed as the absorbent material for possible special soil applications. Such materials may be formed capable of binding water tightly. The theory of such molecular seives is briefly disclosed at columns 3–5 of Rabinowitz U.S. Pat. No. 3,612,939.

In the embodiment of FIG. 2, absorbent particles 20 are formed of a suitable size for random dispersion throughout the back-fill soil. It is preferable to use large particles to minimize the surface to volume ratio, and thus, the surface available for evaporation. By premixing soil with relatively large particles (e.g., 10 cm effective diameters or more) the soil fills any void spaces created between the large particles. This minimizes such void pockets of extremely low thermal conductivity. Such voids may also be filled by using some smaller particles 20 together with the larger ones. To minimize evaporation and also permit uniform dispersion, it is believed that a gradation of particle sizes would be most effective, say, with effective diameters as small as 0.5 cm. to as large as 10 cm., or larger. The precise sizing is not critical and will depend upon the type and depth of soil. A suitable soil includes at least 20% of the particles with a diameter of at least 0.5 cm.

Since the object of the invention is to increase the thermal conductivity and capacity of the soil by increasing its water content, it is apparent that the absorbent materials of the present invention should be soaked with sufficient quantities of water and for a sufficient time to essentially saturate the absorbent materials. In this manner, the thermal conductivity and capacity of the soil is maximized for a given quantity of added absorbent particles.

Referring to FIG. 2, a preferred embodiment of absorbent particles 20 is illustrated in which the absorbent water-soaked core 21 is coated with a thin film 22 of material which is essentially impermeable to water and non-biodegradable in the soil.

A major advantage of film 22 is to prevent evaporation of water from the water-soaked core material. In an ideal system, the coating is totally impermeable to water. Thus, all of the water initially present in the soaked core 21 would be retained in the back-fill soil. Of course, cracks in the coating may develop during abrasion or under the pressure of the back-fill soil. However, even in these instances, the great majority of the core material is protected from exposure to evaporation, thereby increasing the life of water retention to a major extent.

Another advantage of such coating is to protect the absorbent particle core from biological components of the soil. Thus, such a coating can protect a biodegradable starch-based absorbent core of the foregoing type.

The thickness of film 22 should be sufficient to provide strength to withstand handling and the pressures created during back-filling. In addition, the film should be of sufficient thickness to prevent permeation of water therethrough. These characteristics are dependent not only upon thickness but also upon the type of material employed for the film. In general, the film of a thickness of 250 microns or less is believed to be suitable for most coating materials. If the coating material is characterized by a low thermal conductivity it is preferable to minimize the thickness of the film to obtain maximum benefit from the high thermal conductivity of the water-soaked absorbent core.

Suitable materials for forming the water impermeable film comprises various synthetic polymers such as polyvinyl chloride, acrylic polymers, polytetrafluoroethylene, or monoolefins such as polyethylene or polypropylene. Other materials such as paints or shellacs including metals or other inorganic fillers may also be employed.

In another form, coating 22 may be in laminate form and comprising two or more layers as where a single layer may not possess all of the desired properties. For example, an inner hydrophilic polymer, such as polyvinyl acetate or a polyester, is readily coated as a film onto soaked absorbent core 21. However, it may not possess sufficient impermeability to prevent substantial evaporation of water from core 21 and may not be of a character to adequately protect the core from harmful elements in the soil. Thus, a second film sufficiently impermeable to protect the core and prevent evaporation such as poly vinylidene chloride may be coated readily onto the first layer but not onto the core directly.

In a further embodiment, instead of forming a laminate to combine layers of different properties in coating 22, a single coating may be applied with modified surface characteristics. For example, the surface of a polystyrene film coating, which is hydrophobic, may be rendered hydrophilic or grafting a hydrophilic monomer onto its surface such as a polyalkyl alcohol or polyhydroxyethyl methacrylate (HEMA). Known grafting techniques may be employed such as oxidation of the film surface to create free radical sites.

One suitable coating material would be a hydrophilic polymer which maintains its structural integrity in the form of a film even in the presence of water. Such a material could be sprayed with an appropriate carrier and permitted to dry on and be bonded to the surface of the particles. Suitable hydrophilic polymers include certain acrylic resins and, under certain circumstances, polyvinyl alcohol.

Hydrophobic polymeric materials may also be employed for the film by use of known techniques. For example, core 21 could be passed through a thin, wet polymer film, say, formed of a solution of polyethylene.

Upon piercing of the film by core 21, a portion of the film wraps around the particles and seals against itself. Then the solvent is permitted to dry. Such hydrophobic coating would not be bonded to the absorbent core.

In another technique, the absorbent soaked particles could be placed in very thin open containers of dry polymeric materials which are then sealed. For example, the particles may be placed into flexible bags followed by heat sealing of the bag opening. Also, the absorbent particles may be placed in rigid containers formed, say, of two hemispheres of a thermo plastic polymer, e.g., polystyrene. Then, the hemispheres are sealed as by the application of heat.

The techniques of spraying a film of shellac, varnish or paint onto a surface are well known. For example, spray cans are available including propellants for spraying such materials in a suitable carrier onto the core for rapid drying.

For uniform coating with a spray, it is preferable that the particles be rotated during spraying. One technique for this purpose is to convey the particles to the top of a spray chamber and simultaneously contact them with the spray during gravitation of the particles.

In another embodiment, the particles could be sprayed on a vibratory or air bearing conveyor. In this embodiment, soaking and coating may be accomplished in the same system. For example, the absorbent cores may pass on a conveyor through a first zone in which they are soaked with water and, thereafter, through a second zone in which the film is applied.

When the absorbent particles are not protected by a film 22, it may be desirable to include surfactant chemicals to reduce the rate of evaporation. Such surfactants would be most beneficial for back-fill soil subjected to very hot dry temperatures, such as in desert-like areas.

Referring to FIG. 3, an expanded view of heat pipe 14 of FIG. 1 is illustrated in combination with further means for retaining the water adjacent to coiled portion 16a of heat pipe 14. A relatively good heat transfer sheath generally denoted by the number 29 is illustrated serving, when disposed in the hole, to isolate back-fill soil 19 containing absorbent particles 20 from the surrounding soil. Sheath 29 may include a roof 30 with downwardly projecting edges 30a meeting with a bottom sheet 31 of a cross-section conforming to the adjacent hole wall. Sheath 29 is formed of water-impermeable, non-biodegradable material such as a metal or synthetic polymer. The edges of roof 30 and bottom sheet 31 are suitably sealed with an adhesive or, where formed of a thermoplastic material such as polyethylene, may be sealed by the application of heat.

A major cause of loss of water is upward evaporation. Accordingly, roof 30 may be employed without bottom sheet 31, if desired. Alternatively, roof 30 may be omitted leaving bottom sheet 31 to prevent water removal below and to the sides of heat pipe portion 14a.

It is preferable that sheath 29 be formed of a material which does not interfere with heat transfer to the surrounding soil. For efficiency of operation, it is preferable for this material to be a good heat conductor such as metal. However, if this is impractical due to costs, synthetic polymeric materials may also be employed so long as they are not of excessive thickness so as to interfere with good heat transfer with the adjacent soil.

Sheath 29 is suitably formed by the following steps. After the hole is dug, bottom sheet 31 is laid to conform to the hole walls. Then pipe 14a is laid to the interior of the sheath together with back-fill soil containing soaked absorbent particles 20. Then, roof 30 is placed over the upper surface of the back-fill soil and sealed with bottom sheet 31. Finally, the remainder of the back-fill without absorbent is placed over roof 30.

Referring again to FIG. 3, the soaked absorbent particles 20 are illustrated as being distributed in a concentric, compacted layer surrounding the coil in heat transfer pipe 14a. Thus, pipe 14a is totally surrounded by a layer which includes a major portion of, and preferably consists essentially of, particles 20.

A suitable sequence to accomplish the specific back-fill layering of FIG. 3 is as follows. First, the hole is dug and, optionally, partially back-filled with soil containing some absorbent particles. Then, pipe 14a is laid and surrounded with a layer exclusively containing absorbent particles 20 including a size gradation of sufficient small particles to fill the voids among the larger ones. Soaking of the particles may be performed by previously mentioned techniques and in one of the sequences set forth above.

The advantage of forming a layer of the preceding paragraph is illustrated by the following analysis. To maximize heat removal from a heat source, it is important to concentrate the increase in thermal conductivity in the medium adjacent to the source and to disperse the increase over a larger volume. Applying this principle to the present invention, for a given volume of absorbent particles 20, it is preferable for a maximum increase in the heat transfer to concentrate the particles as illustrated in FIG. 3 rather than to disperse them throughout the trench volume.

There may be special circumstances where the soil is preferably dispersed among absorbent particles 20. For example, as set forth above, such particles may be so large that substantial air void space of low thermal conductivity would be created between particles. Pre-mixing with soil would fill the voids to some extent with soil of better thermal conductivity than the air of void spaces.

In an alternative embodiment, referring to FIG. 4 the water soaked absorbent core of the jacketed particles of FIG. 2 would be replaced by liquid water. In this instance, bag 32 is of sufficient strength to resist rupturing during the back-filling operation and afterwards. Of course, rupturing is more critical in this water embodiment than in the foregoing absorbent core one because the liquid water would be free to run out of the rupture whereas the absorbent would retain the water under the pressure of overhead soil. A suitable jacket for bag 32 is a flexible balloon-like bag formed of substantially water-impermeable polymeric material. Thus, the water 33 could be filled into polyethylene bags of the foregoing preferred size ranges which are then heat-sealed. It is important to avoid substantial air bubbles during filling which would reduce the thermal conductivity of the particles.

What is claimed is:

1. In a heat pump structure for cooling or heating a conditioned air space,
    (a) a heat exchange zone,
    (b) a refrigerant fluid line extending through said heat exchange zone,
    (c) an underground heat pipe extending through said heat exchange zone, and including a heat conductive portion, the underground portion of said pipe being continuous,
    (d) back-fill soil around said underground pipe heat conductive portion, and (e) a plurality of water-filled bags dispersed in said back-fill soil.

2. The structure of claim 1 together with an impermeable roof dispersed over the upper surface of the back-fill soil and heat pipe.

3. The structure of claim 1 together with an impermeable lower sheet with upwardly extending side walls and a bottom disposed below and to the sides of said heat pipe.

4. The structure of claim 1 in which said bags form a concentrated layer about said heat pipe.

5. The structure of claim 3 in which said bags are present in a gradation of sizes sufficient for void spaces among the larger particles to be filled to a sufficient extent with the smaller particles.

6. The structure of claim 1 in which the walls of the water-filled bags are flexible.

* * * * *